United States Patent [19]
Yamada et al.

[11] Patent Number: 5,851,608
[45] Date of Patent: Dec. 22, 1998

[54] PAPER CONTAINER FOR LIQUID AND PROCESS FOR PRODUCING THE SAME

[75] Inventors: Kazuki Yamada; Hirotaka Tsunoda, both of Tokyo-to, Japan

[73] Assignee: Dai Nippon Printing Co., Ltd., Tokyo-to, Japan

[21] Appl. No.: 210,254

[22] Filed: Mar. 18, 1994

Related U.S. Application Data

[63] Continuation of Ser. No. 59,181, May 7, 1993, abandoned, which is a continuation of Ser. No. 777,671, Oct. 15, 1991, abandoned.

[30] Foreign Application Priority Data

Oct. 16, 1990 [JP] Japan ..................... 2-277473
Feb. 14, 1991 [JP] Japan ..................... 3-042736

[51] Int. Cl.$^6$ ..................................... B65D 5/72
[52] U.S. Cl. ............... 428/34.2; 428/35.7; 428/481; 428/513; 428/520; 222/83; 222/91; 222/551; 222/566; 222/567; 222/568; 222/572; 222/574; 229/122; 229/204; 229/213; 229/214; 229/217; 229/238; 229/248
[58] Field of Search ..................... 222/566, 568, 222/572, 574, 569, 567, 83, 91, 551; 229/122, 213, 214, 217, 238, 248, 204; 428/34.2, 35.4, 35.5, 520, 515, 511, 513, 481, 35.7

[56] References Cited

U.S. PATENT DOCUMENTS

| | | | |
|---|---|---|---|
| 4,483,464 | 11/1984 | Nomura | 222/83 |
| 4,489,112 | 12/1984 | Wise | 428/34.2 |
| 4,510,205 | 4/1985 | Weemes et al. | 428/35.4 |
| 4,513,036 | 4/1985 | Thompson et al. | 428/34.2 |
| 4,622,268 | 11/1986 | Yatsu et al. | 428/480 |
| 4,669,640 | 6/1987 | Ando | 222/569 |
| 4,698,246 | 10/1987 | Gibbons et al. | 428/511 |
| 4,723,689 | 2/1988 | Vallos et al. | 222/83 |
| 4,753,832 | 6/1988 | Brown et al. | 428/34.2 |
| 4,813,578 | 3/1989 | Gordon et al. | 229/214 |
| 4,939,009 | 7/1990 | Beavers et al. | 428/520 |
| 5,433,982 | 7/1995 | Yamada et al. | 428/34.2 |

*Primary Examiner*—Rena L. Dye
*Attorney, Agent, or Firm*—Ladas & Parry

[57] ABSTRACT

A paper container for a liquid including a base material including: a paper layer, a polyolefin type resin layer disposed on one side of the paper layer, for providing an outer surface, and a saturated polyester resin layer disposed on the other side of the paper layer by the medium of a polyolefin type resin layer, for providing an inner surface; the paper container being formed from the base material so that the polyolefin type resin layer for providing the outer surface provides an outer peripheral surface of the container, wherein the saturated polyester resin layer for providing the inner surface comprises an amorphous or low crystallinity saturated polyester resin having a glass transition point of not lower than 40° C., and a portion of the base material to be disposed on the inner side of the paper container with respect to the paper layer has a water vapor permeability of not higher than 25 g/m$^2$·24 hr·1 atm. When such a paper container is used, the content contained therein may retain its aroma component in a good state, and the water in the content does not penetrate into the paper container.

18 Claims, 8 Drawing Sheets

PAPER CONTAINER FOR LIQUID AND PROCESS FOR PRODUCING THE SAME

This is a continuation of application Ser. No. 08/059,181 filed on May 7, 1993, now abandoned which is a continuation of application Ser. No. 07/777,671 filed on Oct. 15, 1991, now abandoned.

BACKGROUND OF THE INVENTION

The present invention relates to a paper container for containing therein a liquid such as juice and liquid yogurt, and a process for producing such a paper container.

Hitherto, in the field of a paper container for a liquid, the sealing portion of the container is formed by utilizing heat fusing property (or heat fusibility) of a laminate sheet for the paper container. Such a container is formed by using a laminate sheet for a paper container comprising a heat sealing (or heat sealable) resin layer made of a polyolefin type resin so that the heat fusing property of the polyolefin type resin may be utilized.

In the case of the above paper container formed from the laminate sheet for the paper container comprising the heat sealing resin layer made of the polyolefin type resin, the inner peripheral surface layer of the container is formed from the heat sealing resin layer comprising the polyolefin type resin. Accordingly, at the time at which the polyolefin type resin layer is formed for the purpose of obtaining the above laminate sheet, or in a process wherein the paper container is formed by using such a laminate sheet, the polyolefin type resin is decomposed under heating (or pyrolyzed) to produce a volatile component such as aliphatic hydrocarbons, and such a volatile component can migrate to a content (or substance) to be contained in the resultant paper container. As a result, there can be posed a problem such that the taste of the content contained in the paper container may be changed or foreign odor can be imparted to the content.

SUMMARY OF THE INVENTION

An object of the present invention is to provide a paper container for a liquid which is excellent in storage property when it contains therein a content containing an aromatizing or fragrance component, does not pose a problem such that the odor due to polyolefin based on the inner peripheral surface layer of the container can migrate to the content contained therein, and does not pose a problem such that the water content in the liquid contained in the paper container penetrates into the paper constituting the paper container to reduce the body (or stiffness) of the paper, whereby the body (or trunk) of the container is swelled.

Another object of the present invention is to provide a process for producing such a paper container.

According to the present invention, there is provided a paper container for a liquid comprising a base material comprising: a paper layer, a polyolefin type resin layer disposed on one side of the paper layer, for providing an outer surface, and a saturated polyester resin layer disposed on the other side of the paper layer by the medium of a polyolefin type resin layer, for providing an inner surface; the paper container being formed from the base material so that the polyolefin type resin layer for providing the outer surface provides an outer peripheral surface of the container;

wherein the saturated polyester resin layer for providing the inner surface comprises an amorphous or low-crystallinity saturated polyester resin having a glass transition point of not lower than 60° C., and a portion of the base material to be disposed on the inner side of the paper container with respect to the paper layer has a water vapor permeability of not higher than 25 g/m$^2$·24 hr·1 atm.

When the paper container for a liquid according to the present invention having the above structure is used, the aromatic component constituting the content contained in the paper container is not absorbed into the paper container and good performance can be obtained with respect to the property for retaining the taste and the aroma of the content. In addition, even when the paper container for a liquid according to the present invention is stored for a certain period of time while it contains therein a liquid, there is not posed a problem such that the water contained in the content penetrates into the paper layer of the paper container to reduce the body (or stiffness) thereof. Accordingly, the paper container according to the present invention does not cause the swelling of the body (or trunk) thereof, during the storage of the paper container containing therein the content.

As a result, the paper container according to the present invention does not provide an improper appearance which can create an impression that the freshness of the content has been lost during the distribution of the articles or goods relating to the paper container. Accordingly, a high quality paper container is provided according to the present invention.

The present invention also provides a process for producing a paper container for a liquid, comprising:

providing a blank plate comprising a rectangular base material comprising; a paper layer, a polyolefin type resin layer disposed on one side of the paper layer, for providing an outer surface, and a saturated polyester resin layer disposed on the other side of the paper layer by the medium of a polyolefin type resin layer, for providing an inner surface; the saturated polyester resin layer comprising an amorphous or low-crystallinity saturated polyester resin having a glass transition point of not lower than 60° C.;

bonding left and right side portions of the blank plate to each other to form a cylindrical member so that the polyolefin type resin layer for providing the outer surface provides an outer peripheral surface of the container;

treating with corona discharge a surface portion of the polyolefin type resin layer which is to be subjected to heat fusion between the polyolefin type resin layer providing the outer surface of the base material and the saturated polyester resin layer providing the inner surface thereof at the time of the formation of a bottom portion of the paper container, so as to provide a wet tensile strength of the surface treated with the corona discharge of 36 to 52 dyne, and filling the cylindrical member with a content and forming the bottom portion of the paper container.

According to the production process of the present invention, when a paper container for a liquid having an aroma retaining property is intended to be obtained, the heat bonding portion to be disposed between the outer surface resin layer and the inner surface resin layer at the bottom portion of the paper container may be formed, e.g., at a heat sealing temperature which does not produce a pin hole or does not scorch the paper. As a result, there may be provided a paper container for a liquid of good quality having an aroma retaining property.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Hereinbelow, embodiments of the present invention will be described with reference to the accompanying drawings.

Figure 1:
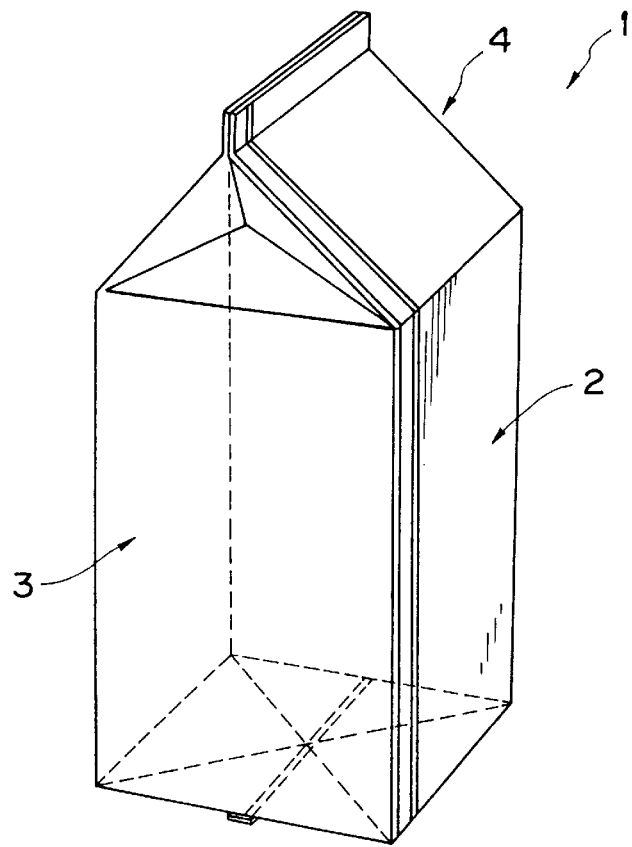
FIG. 1 is a perspective view showing an embodiment of the paper container for a liquid according to the present invention.
Figure 2:
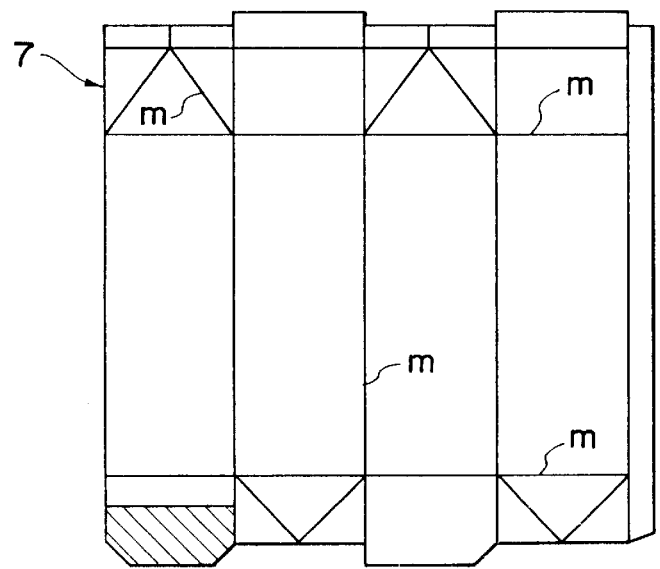
FIG. 2 is a development view showing a blank plate for the paper container for a liquid shown in FIG. 1.

FIG. 1 is a perspective view showing an embodiment of the paper container according to the present invention. In FIG. 1, a paper container 1 is a container in the form of a carton which has been shaped by using a base material 2, and comprises a body portion 3 and a top portion 4 continuously connected thereto. FIG. 2 shows a blank for the paper container in the form of a carton as shown in FIG. 1. The blank 7 is shaped by punching the base material sheet 2. In FIG. 2, the portions denoted by the references m, m, . . . , m are pressing lines for folding processing.

Figure 3:
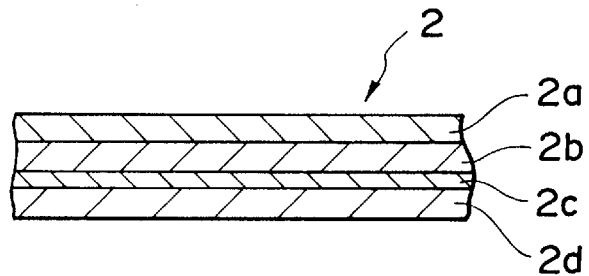
FIG. 3 is a sectional view showing an embodiment of a base material to be used for the paper container for a liquid according to the present invention.

FIG. 3 is a sectional view of the base material 2 constituting the container 1. In FIG. 3, the base material 2 has a laminate structure comprising a polyolefin type resin (PE) layer 2a, a paper layer 2b, a polyolefin type resin layer 2c, and an amorphous or low-crystallinity saturated polyester type resin layer 2d having a glass transition point (or temperature) of 60° C. or higher.

In the present invention, the structure of the base material 2 is not restricted to that as shown in FIG. 3, but the layer constituting inner surface of the container 1 is the above amorphous or low-crystallinity saturated polyester resin layer having a glass transition point of 60° C. or higher. The reason for this is that the aromatic component of a content contained in the container 1 is prevented from being adsorbed to the container by use of such a structure. Further, the reason for the glass transition point of the saturated polyester resin layer of 60° C. or higher is that the saturated polyester resin layer is caused to sufficiently exhibit an excellent aroma retaining property under an environmental condition of below 60° C. from a viewpoint such that the container containing therein a content such as food is generally placed in an environment of below 60° C.

In the present invention, the amorphous or low-crystallinity saturated polyester resin layer having a glass transition point of 60° C. or higher may be formed by using an amorphous or low crystallinity saturated polyester resin having a crystallinity of 10% or lower. Such a resin may be a polyester resin formed by the co-condensation using a diol component (or di-alcohol component) such as ethylene glycol, propylene glycol, and 1, 4-cyclohexane dimethanol (or diethylene glycol); and a dicarboxilic acid component such as an aliphatic dicarboxylic acid (inclusive of adipic acid, sebacic acid, etc.,) and an aromatic dicarboxylic acid (inclusive of terephthalic acid, isophthalic acid, diphenyl dicarboxylic acid, etc.). Specific examples of such a polyester resin may include polyester resin comprising a co-condensation polymer product produced from a combination of; ethylene glycol and terephthalic acid, ethylene glycol, isophthalic acid and terephthalic acid, 1, 4-cyclohexane dimethanol, ethylene glycol and terephthalic acid, propylene glycol, isophthalic acid and terephthalic acid, etc. The above polyester resin may also be produced by using a trivalent carboxylic acid such as trimellitic acid as a part of the acid component or by using a trihydric alcohol such as trimethylol propane as a part of the alcohol component, or by using a trivalent carboxylic acid as a part of the acid component and a trihydric alcohol as a part of the alcohol component, etc., when a polyester resin is produced by polymerization using the above terephthalic acid and ethylene glycol as a base material.

In a case where the above polyester resin is a polyester resin comprising 10 wt. % or more of the aliphatic dicarboxylic acid component in the acid component, the resin layer comprising such a polyester resin is not preferred since it does not have a sufficient aroma retaining property.

The above polyolefin type resin layer 2c functions as an adhesive layer between the paper layer 2b and the saturated polyester resin layer 2d, and also has a function of decreasing the water vapor permeability (or water vapor transmission) of the laminate resin layer disposed on the inner side with respect to the paper layer 2b.

The polyolefin type resin layer 2c disposed between the paper layer 2b and the saturated polyester resin layer 2d may preferably comprise a carboxyl group-modified polyolefin resin which shows a good adhesion property with respect to the amorphous or low-crystallinity saturated polyester resin layer having a glass transition point of 60° C. or higher. The polyolefin type resin layer 2c may also comprise a composite (or combination) resin layer comprising a carboxyl group modified polyolefin type resin and a polyolefin type resin having a good adhesion property with respect to the paper. In the case of such a composite resin layer, the composite resin layer may be disposed between the paper layer 2b and the saturated polyester resin layer 2d so that the carboxyl group modified polyolefin type resin layer is caused to contact the saturated polyester resin layer 2d.

The laminate resin layer (2c/2d) comprising the polyolefin type resin layer 2c and the amorphous or low-crystallinity saturated polyester resin layer 2d having a glass transition point of 60° C. or higher which has been formed with respect to the paper layer 2b, i.e., the laminate resin layer (2c/2d) disposed in the inner side with respect to the paper layer 2b has a water vapor permeability of 25 $g/m^2 \cdot 24$ hr·1 atm or lower. Further, the laminate resin layer (2c/2d) disposed in the inner side with respect to the paper layer 2b has an oxygen permeability of 900 $cc/m^2 \cdot 24$ hr·1 atm or lower. Specific examples of such a laminate structure comprising the polyolefin type resin layer 2c and the amorphous or low-crystallinity saturated polyester resin layer 2d may include.

(1) polyethylene resin layer/amorphous or low-crystallinity saturated polyester resin layer having a glass transition point of 60° C. or higher.

(2) co-extrusion laminate resin layer comprising a carboxyl group-modified adhesive polyethylene resin layer/ amorphous or low-crystallinity saturated polyester resin layer having a glass transition point of 60° C. or higher.

(3) polyethylene resin layer/carboxyl group-modified adhesive polyethylene resin layer/amorphous or low-crystallinity saturated polyester resin layer having a glass transition point of 60° C. or higher.

The above laminate resin layer may be either a co-extrusion laminate resin layer, or a laminate comprising respective resin layers and one or more adhesive layers disposed between the respective layers.

When the amorphous or low-crystallinity saturated polyester resin layer 2d having a glass transition point of 40° C. or higher constituting the laminate resin layer has a thickness of below 5 $\mu$m, the stability thereof may be decreased. On the other hand, when the thickness exceeds 60 $\mu$m, the resin layer may become hard to lower the shaping characteristic of the paper container. Accordingly, the saturated polyester layer 2d may generally have a thickness of about 5 to 60 $\mu$m.

In the paper container 1 which has been formed by using the base material 2 as described above, the inner peripheral surface of the paper container 1 is constituted by the amorphous or low-crystallinity saturated polyester resin layer 2d having a glass transition point of 60° C. or higher. The resin layer 2d constituting the inner peripheral surface shows an excellent aroma retaining property in an atmosphere of below the glass transition point of the saturated polyester resin constituting the resin layer 2d. In connection with this, since the paper container 1 for a liquid may generally be placed in an atmosphere showing a temperature of below 60° C., the paper container for a liquid according to the present invention shows an excellent aroma retaining property with respect to the content to be contained therein.

In the paper container for a liquid according to the present invention, since the inner surface of the base material to be formed into the paper container is constituted by the amorphous or low crystallinity resin layer 2d, a good adhesion strength may be provided in the bonded portion of the paper container formed by heat bonding.

In the paper container for a liquid according to the present invention, since the laminate resin layer (2c/2d) disposed on the inner side with respect to the paper layer 2b has a water vapor permeability of 25 $g/m^2 \cdot 24$ hr·1 atm or lower, the water content in the paper constituting the paper layer 2b is not increased to such an extent that the body of the paper container is swelled, on the basis of the water contained in the content in the paper container. As a result, good performances may be exhibited with respect to the storability and the stability.

In the resin layer 2d constituting the inner peripheral surface of the paper container, the main component thereof comprising the copolymerization product produced from ethylene glycol and terephthalic acid may exhibit an excellent aroma retaining property, and further the copolymerization product produced from the alcohol component other than the ethylene glycol and/or the carboxylic acid component other than the terephthalic acid may exhibit good heat resistance. Accordingly, for example, even after the resin layer 2d is subjected to heating, etc., when the container is filled with a content under heating, the resin layer 2d constituting the inner peripheral surface may still have an excellent heat bonding property, and the heat sealing portion of the paper container, which is formed after the container is filled with the content under heating, may also provide an excellent adhesion strength.

In a case where the paper container 1 is formed by using the blank 7 formed from the base material as described above, heat fusion is effected between the polyolefin type resin layer 2a to be disposed on the outer surface side of the paper container, and the saturated polyester resin layer 2d to be disposed on the inner surface side of the paper container. In the present invention, in order to completely effect the heat fusion at a lower temperature, a portion of the polyolefin type resin layer 2a constituting the blank 7, which is to be subjected to heat fusion in the formation of the paper container, may preliminarily be subjected to a corona discharge treatment so as to provide a wet tensile strength (or wet strength) of 36 to 52 dyne in the resultant surface subjected to the corona discharge treatment.

When the portion of the polyolefin type resin layer 2a to be subjected to the heat fusion is subjected to the corona discharge treatment in the above manner, the heat bonding portion to be formed between the outer surface resin layer 2a and the inner surface resin layer 2d at the time of the formation of the bottom portion of the paper container may be subjected to a sealing operation at a sealing temperature of about 150° C. As a result, a heat bonding portion having a sufficient adhesion strength may be formed without causing a pin hole or paper scorch in the heat bonding portion.

When the surface subjected to the corona discharge treatment has a wet tensile strength of below 36 dyne, the effect of the corona discharge treatment is not sufficient. On the other hand, the resultant wet tensile strength exceeds 52 dyne, the effect of the corona discharge treatment corresponding to such a wet tensile strength cannot be obtained. Accordingly, the corona discharge treatment may preferably be conducted so as to provide the resultant wet tensile strength of 36 dyne to 52 dyne.

Figure 4:
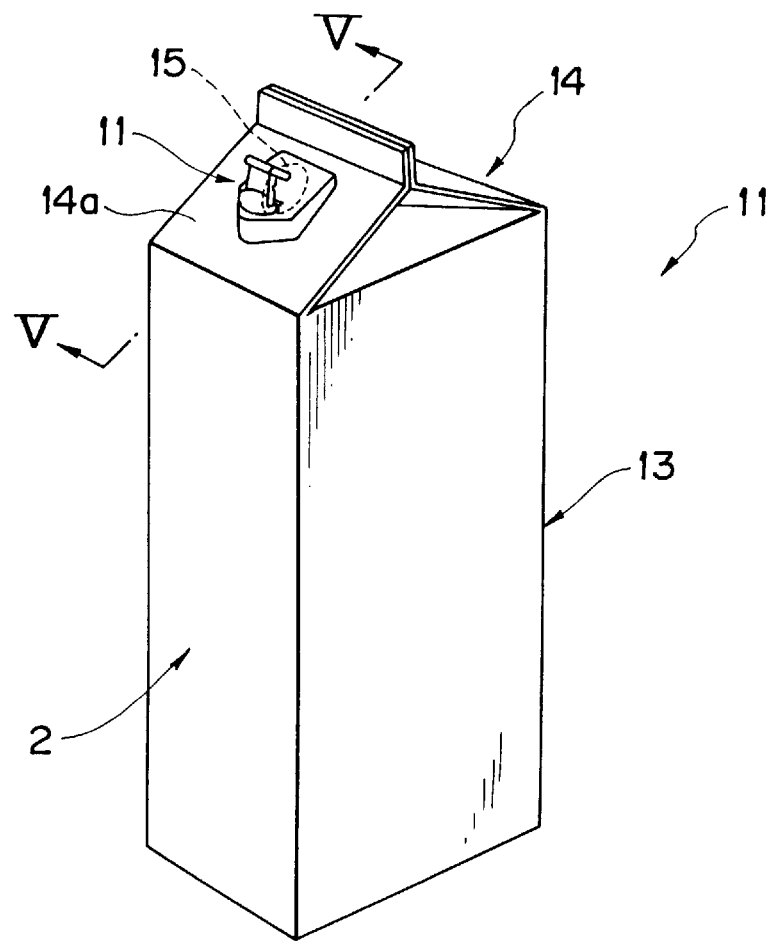
FIG. 4 is a perspective view showing an embodiment of the paper container for a liquid according to the present invention.

FIG. 4 is a perspective view showing an embodiment of the container according to the present invention. In FIG. 4, a paper container 11 is a container in the form of a carton which has been shaped by using a base material 2, and comprises a body portion 13 and a top portion 14 continuously connected thereto. In an inclined panel 14a of the top portion 14, an opening portion 15 is formed, and a pouring member (or discharging member) 21 is mounted to the opening portion 15.

Figure 5:
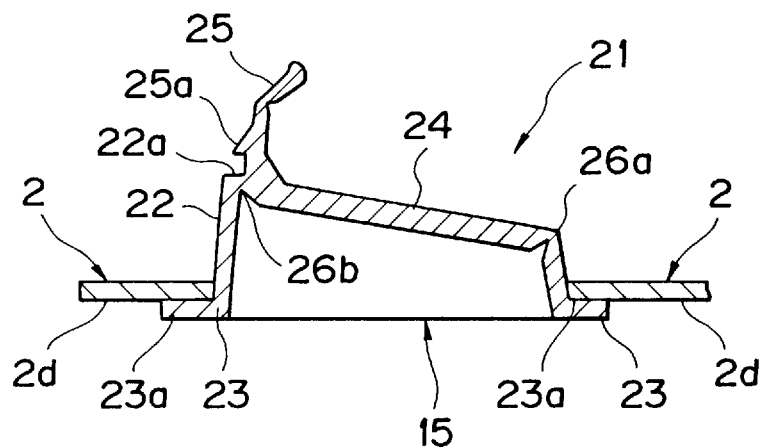
FIG. 5 is a longitudinal sectional view showing a pouring (or discharging) member shown in FIG. 4, taken along the line V—V.

The base material 2 to be used in this embodiment is one having a structure which is the same as that of the base material 2 as described hereinabove. Accordingly, such a base material is denoted by the same reference numeral and the description thereof is omitted. FIG. 5 is a longitudinal sectional view showing the pouring (or discharging) member 21 shown in FIG. 4, taken along the line V—V. In FIG. 5, the pouring member 21 comprises a base portion 22 having in a lower peripheral portion thereof a flange 23 for fixing the pouring member 21 to the inclined panel 14a; an on-off (an open-close) portion 24; and a pulling member 25 disposed in an end of the on-off portion 24. The on-off portion 24 is formed integrally with the base portion 22 by the medium of a small thickness portion 25 formed in the periphery of the on-off portion. The base portion 22 of the pouring member 21 is inserted into the opening portion 15 from the inside of the container 11, and is mounted to the inclined panel 14a by fixing a sealing portion 23a of the flange 23 to the inner surface 2d of the base material 2 constituting the inner surface of the container. When the content is poured out (or discharged) from the pouring member 21, the pulling member 25 is pulled, and then a small thickness portion 26b constituting the small thickness portion 26 other than a small thickness portion 26a functioning as a rotation base for the on-off portion 24 is torn, whereby the on-off portion 24 is opened. When the on-off portion 24 is intended to be closed, after the on-off portion 24 is once opened, the on-off portion 24 is pushed into the base portion 22 so as to be closed. At this time, a projection portion 25a of the pulling member 25 is caused to contact an upper end portion 22a of the base portion 22.

In such a pouring member 21, at least the flange 23 thereof may be formed from an adhesive polyolefin type resin or a linear-saturated polyester resin having a durometer-hardness (HDD) of 20 to 50. In general, the pouring member 21 is formed by an injection molding using the abovementioned resin, and integrally has the flange 23.

As such an adhesive polyolefin type resin, there may be used a polyα-olefin such as polyethylene, ethylene-αolefin copolymer, polypropylene, polybutene, and polyisobutylene; a polydiolefin such as polybutadiene, and polyisoprene; or a copolymer comprising at least two monomers constituting the above polymers. Further, it is also possible to use a copolymer etc., comprising ethylene and,one or at least two species of ethylene type unsaturated monomers. Such an ethylene type unsaturated monomer may singly have a carbonyl group based on carboxylic acid, carboxylic acid salt, carboxylic acid anhydride, carboxylic acid ester, carboxylic acid amide, carboxylic acid imide, aldehyde, ketone, etc.; or may have such a group in combination with cyano group, hydroxy group, ether group or oxirane ring, etc.

Specific examples of the ethylene type unsaturated monomer used for such a purpose may include:

(A) ethylene type unsaturated carboxylic acid;
  acrylic acid, methacrylic acid, maleic acid, fumaric acid, crotonic acid, itaconic acid, citraconic acid, 5-norbornen-2, 3-dicarboxylic acid, etc., (B) ethylene type unsaturated carboxylic acid anhydride:
  maleic acid anhydride, citraconic acid anhydride, 5 norbornen-2, 3-dicarboxylic acid anhydride, tetrahydrophthalic acid anhydride, etc., (C) ethylene type unsaturated ester:
  ethyl acrylate, methyl methacrylate, 2-ethylhexyl acrylate, monoethyl or diethyl maleate, vinyl acetate, vinyl propionate, γ-hydroxy propyl methacrylate, β-hydroxy ethylacrylate, glycidyl acrylate, glycidyl methacrylate, β-N-ethylaminoethyl acrylate, etc., (D) ethylene type unsaturated amide or imide:
  acrylamide, methacrylamide, maleinimide, etc., (E) ethylene type unsaturated aldehyde or ketone:
  acrolein, methacrolein, vinyl methyl ketone, vinyl butyl ketone, etc.

Among these, it is preferred to use an ethylene type unsaturated carboxylic acid or an ethylene type unsaturated carboxylic acid anhydride.

In order to mount such a pouring member 21 to the opening portion 15 formed in the container 11, it is possible to fix the inner surface 2d of the container 11 to the sealing portion 23a of the flange 23 e.g., by use of heat sealing such as ultrasonic heat sealing.

Figure 6:
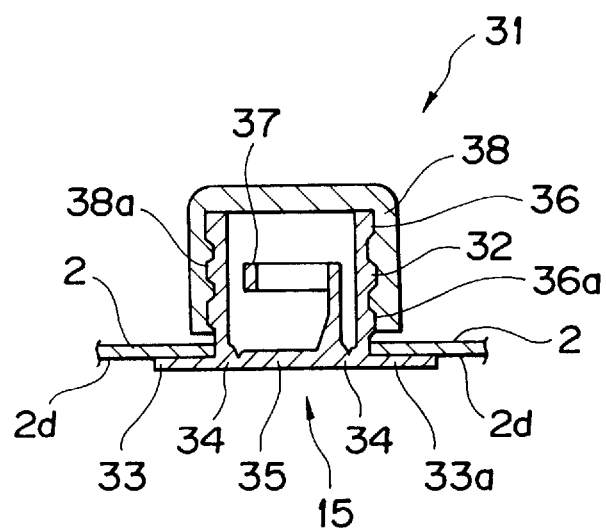
FIG. 6 is a sectional view showing another embodiment of the pouring member to be used for the paper container for a liquid according to the present invention.

FIG. 6 is a sectional view showing another embodiment of the pouring member to be mounted to the above opening portion 15. In FIG. 6, the pouring member 31 comprises a base portion 32 having in a lower peripheral portion thereof a flange 33 for fixing the pouring member 21 to the container; and a cap 38 detachably mountable to the base portion 32. The base portion 32 comprises a peeling portion 35 connected to the flange 33 by the medium of a circular small thickness portion 34, and a cylindrical pouring portion 36 rising from the outer periphery of a small thickness portion 34. The peeling portion 35 comprises a pulling member 37 so that it is placed in the cylindrical pouring portion 36, and a thread portion 36a is formed in the outer peripheral portion of the cylindrical pouring portion 36. Further, a thread portion 38a is formed in the inner peripheral portion of the cap 38 so that it may engage with the thread portion 36a.

In such a pouring member 31, at least the flange 33 thereof may be formed from the above adhesive polyolefin type resin or the above linear-saturated polyester resin having a durometer-hardness (HDD) of 20 to 50. In general, the pouring member 31 is formed by an injection molding using the adhesive polyolefin type resin, and integrally has the flange 33.

The pouring outlet portion 36 is inserted into the opening portion 15 from the inside of the container and the base portion 32 is mounted to the container by fixing a sealing portion 33a of the flange 33 to the inner surface 2d (i.e., the saturated polyester resin layer 2d having a glass transition point of 60° C. or higher) of the base material 2 constituting the inner surface of the container. When the content is poured out (or discharged) from the pouring member 31, the cap 38 is removed from the base portion 32, the pulling member 37 is pulled, and then a small thickness portion 34 is torn, whereby the peeling portion 35 is opened.

Figure 7:
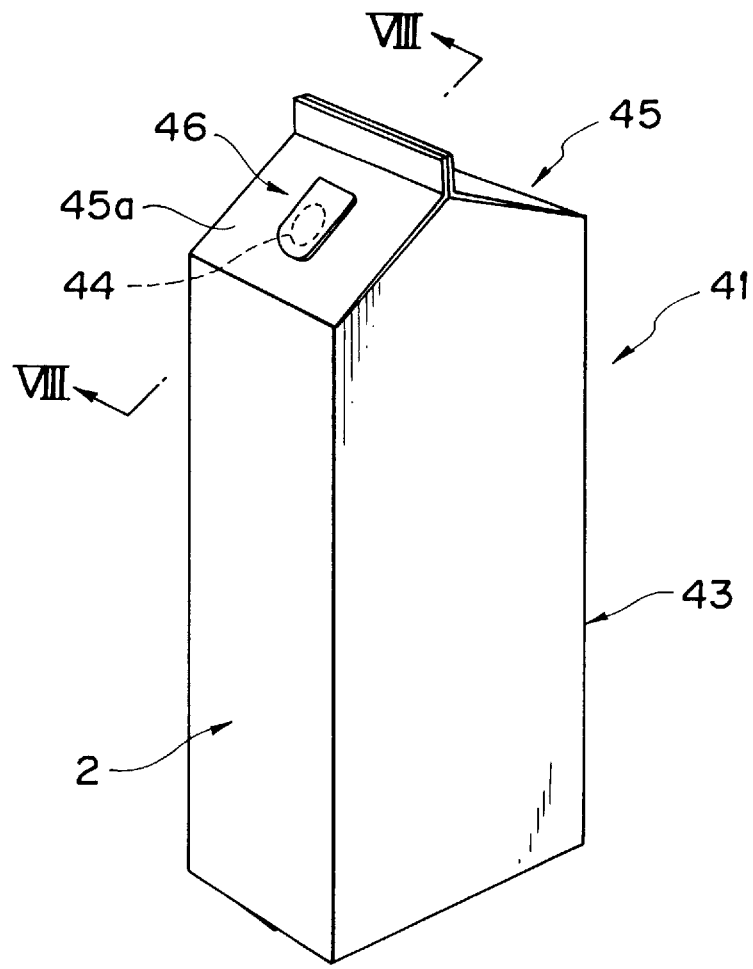
FIG. 7 is a perspective view showing an embodiment of the paper container for a liquid according to the present invention.
Figure 8:
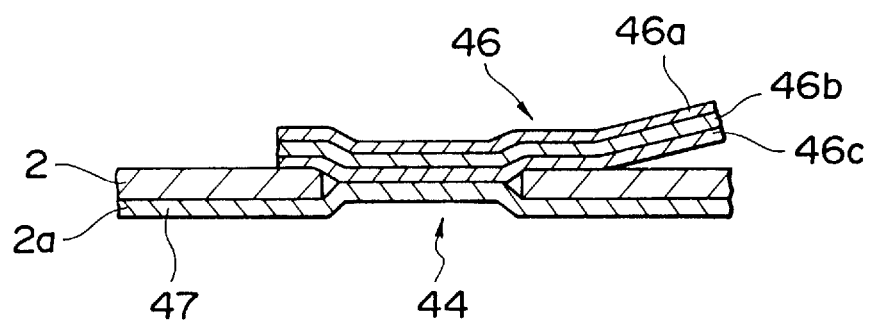
FIG. 8 is a longitudinal sectional view showing a pulling tab shown in FIG. 7, taken along the line VIII—VIII.

FIG. 7 is a perspective view showing another embodiment of the paper container according to the present invention. In FIG. 7, a paper container 41 is a container in the form of a carton which has been shaped by using a base material 2 in the same manner as in the above paper container 1, and comprises a body portion 43 and a top portion 45 continuously connected thereto. Further, an opening portion 44 is formed in an inclined panel 45a constituting the top portion 45, and a pulling tab 46 is mounted to the opening portion 44. FIG. 8 is a longitudinal sectional view showing the pulling tab shown in FIG. 7, taken along the line VIII—VIII. In FIG. 8, the opening portion 44 formed in the base material 2 is sealed with the pulling tab 46 disposed on the out side of the container, and is also sealed with a sealing film 47 disposed on the inner side of the container. The base material 2 comprises a laminate comprising a saturated polyester resin layer 2d constituting the inner surface thereof as described above. The pulling tab 46 comprises a laminate formed of a polyethylene terephthalate (PET) layer 46a, an aluminum (Al) layer 46b and a polyethylene resin (PE) layer 46c, and has a barrier property to a gas and water. The pulling tab 46 covers the opening portion 44 so that the PE layer 46c thereof is fixed to the outer surface 2a of the base material 2. The sealing film 47 comprises an adhesive polyolefin type resin or a linear-saturated polyester resin having a durometer-hardness (HDD) of 50 to 90, and the PE layer 46c of the pulling tab 46 and the sealing film 47 are fixed to each other in the opening portion 44.

When a content is poured out from such a container 41, the pulling tab 46 is peeled therefrom and then the sealing film 47 is cut around the periphery of the opening portion 44, whereby the cut portion is removed from the container together with the pulling tab 46 and the opening portion 44 appears.

Figure 9:
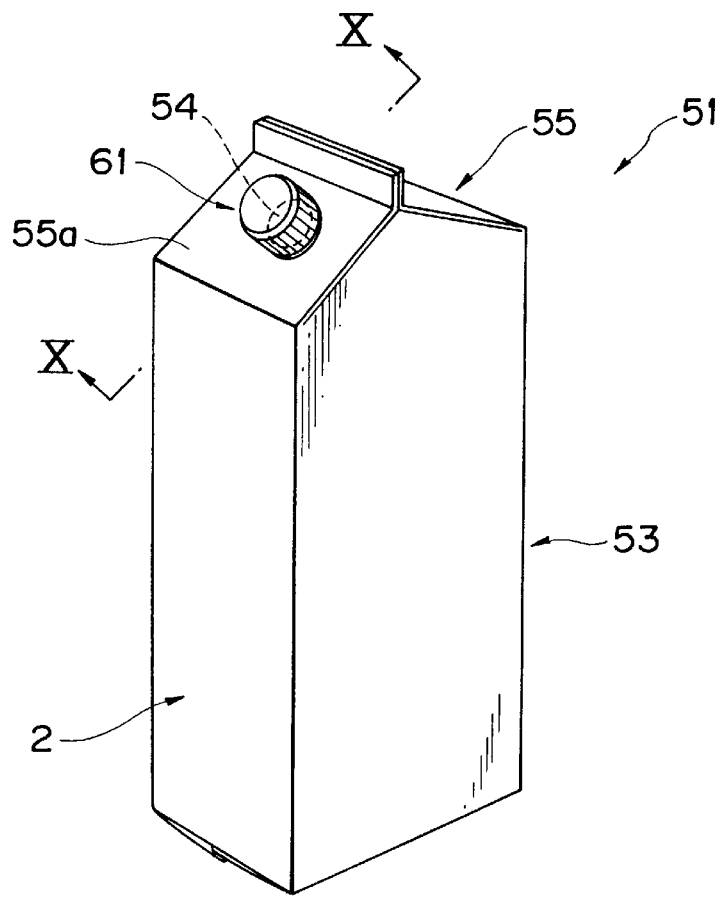
FIG. 9 is a perspective view showing an embodiment of the paper container for a liquid according to the present invention.

FIG. 9 is a perspective view showing another embodiment of the paper container according to the present invention. In FIG. 9, a paper container 51 is a container in the form of a carton which has been shaped by using a base material 2 in the same manner as in the above paper container 1, and comprises a body portion 53 and a top portion 55 continuously connected thereto. Further, an opening portion 54 is formed in an inclined panel 55a constituting the top portion 55, and a pouring member 61 is mounted to the opening portion 54.

Figure 10:
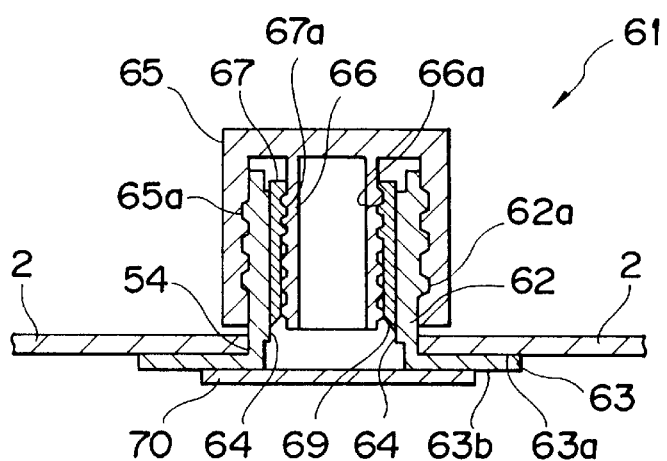
FIG. 10 is a longitudinal sectional view showing the pouring member shown in FIG. 9, taken along the line X—X.

FIG. 10 is a longitudinal sectional view showing the pouring member 61 shown in FIG. 9, taken along the line X—X. In FIG. 10, the pouring member 61 comprises a base portion 62 having in a lower peripheral portion thereof a flange 63 for fixing the pouring member 61 to the inclined panel 55a; a cap 65 detachably screwed to the base portion 62; a cutter 67 detachably screwed to a cutter engagement portion 66 formed in the cap 65; and a sealing film 70 which is fixed to a sealing surface 63b of the flange 63 so as to cover the opening portion at the center of the flange 63. The pouring member 61 is inserted into the opening portion 54 of the container 51 from the inside thereof and a sealing portion 63a of the flange 63 is fixed to the resin layer 2d of the base material 2 constituting the inner surface of the container so that the pouring member 61 is mounted to the inclined panel 55a. The base portion 62 of the pouring member 61 projected from the opening portion 54 into the outside of the container.

Figure 11:
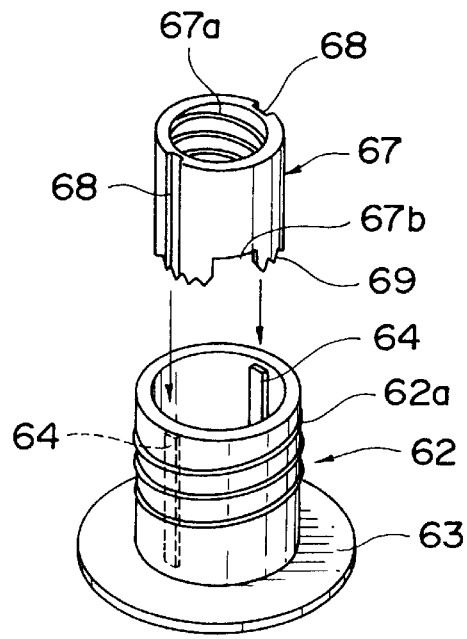
FIG. 11 is a perspective view showing a base portion and a cutter as components constituting the pouring member to be used in the present invention.

The base portion 62 has a cylindrical shape as shown in FIG. 11 and has a flange 63 in a lower peripheral portion thereof. A thread portion 62a is formed in the outer peripheral portion of the base portion 62. On the other hand, in the inner peripheral surface of the base portion 62, guide portions 64 and 64 are disposed along the axis direction so that they are disposed opposite to each other. At least the flange 63 of the pouring member 61 comprises a saturated polyester resin having a glass transition point of 60° C. or higher, in the same manner as in the case of the inner surface of the container 51. When such a structure is adopted, the sealing portion 63a of the flange 63 and the inner surface 2d of the base material 2 constituting the inner surface of the container may be fixed to each other by using heat sealing such as ultrasonic vibration sealing, so that the pouring member 61 is mounted to the inclined panel 55a of the container 51.

Figure 12:
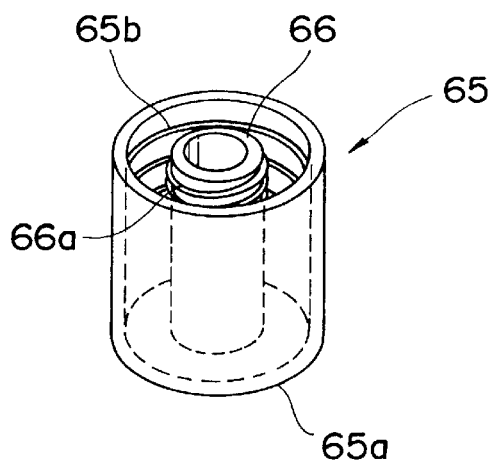
FIG. 12 is a perspective view showing a cap as a component constituting the pouring member to be used in the present invention.

The cap 65 comprises a cylindrical cap having an upper blocking portion 65a as shown in FIG. 12. A thread portion 65b is formed on the inside peripheral surface thereof and the cap 65 may be screwed to the base portion 62 by engaging the thread portion 65b and a thread portion 62a of the base portion 62. In the inside of the cap 65, a cylindrical cutter engagement portion 66 is disposed so that it projects from the upper blocking portion 65a. Further, a thread portion 66a is formed on the outer peripheral surface of the cutter engagement portion 66.

The cutter 67 has a cylindrical shape as shown in FIG. 11, and has a dimension such that it may be inserted into the interior of the base portion 62 so that it is vertically movable. On the outer peripheral surface of the cutter 67, a guide groove 68 is formed. Since the cutter 67 is inserted into the interior of the base portion 62 so that the above guide groove 68 may be engaged with the guide portions 64 and 64 as described above, the cutter 67 is prevented from rotating in the interior of the base portion 62. On the inner peripheral surface of the cutter 67, a thread portion 67a is formed. When the thread portion 67a is engaged with the thread portion 66a of the cutter engagement portion 66, the cutter 67 is screwed to the cutter engagement portion 66 of the cap 65. In the lower end portion of the cutter 67, there are disposed a blade 67 for force-cutting a sealing film 70 as described hereinbelow, and a cut away portion 67b.

The sealing film 70 is heat-fused to a sealing surface 63b of the flange 63 so that it covers an opening portion at the center of the flange 63. Accordingly, the sealing film 70 is required to have a good heat fusion adaptability with respect to the flange 63 and another property such as the gas barrier property which is the same as that of the base material 2. For example, such a sealing film 70 may has a three layer structure comprising: an outer layer mainly showing a good heat fusion adaptability with respect to the flange 63, an intermediate layer mainly showing a gas barrier property, and an inner layer mainly showing a non-adsorbing property with respect to an aroma component of a content to be contained in the container. In such a case, the outer layer may comprise an adhesive polyolefin type resin, an adhesive polyester type resin or a linear saturated polyester resin having a glass transition point of 60° C. or higher. Further, the intermediate layer may comprise an aluminum foil, a stretched nylon resin film, etc. In addition, the inner layer may comprise any one layer selected from polyacrylonitrile resin layer, an ethylene/vinyl alcohol copolymer resin layer, a non-stretched nylon resin film layer, polycarbonate resin layer and a saturated polyester resin layer having a glass transition point of 60° C. or higher. Such a sealing film 70 may be subjected to heat fusion by causing the outer layer thereof to contact the sealing surface 63b of the flange 63.

Figure 13:
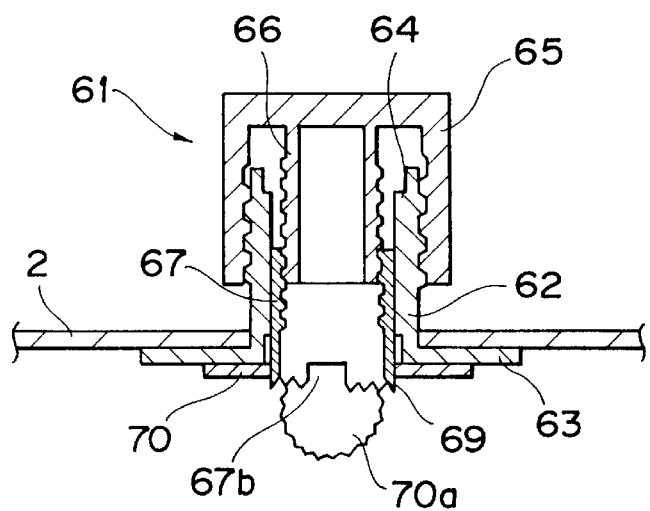
FIG. 13 is a view for illustrating the opened state of the pouring member to be used in the present invention.

When the content is poured from such a pouring member 61, the cap 65 is first rotated to be removed from the base portion 62. FIG. 13 is a sectional view for illustrating such a state. As shown in FIG. 13, when the cap 65 is rotated so as to be moved toward an upper position with respect to the axis direction of the base portion 62, the cutter 67 is moved toward a lower position with respect to the axis direction of the base portion 62. The reason for this is that while the cutter engagement portion 66 is also rotated together with the rotation of the cap 65, the pitch of the thread portion 66a formed in the above cutter engagement portion 66 is larger than the pitch of the thread portion 65b formed in the cap 65, and therefore the cutter 67 of which rotation per se is prevented by a guide projection 64 is moved in the interior of the base portion 62 in the direction reverse to the moving direction of the cap 65, on the basis of the rotation of the cutter engagement portion 66. Then, when the cutter 67 is moved in the interior of the base portion 62 toward a lower position with respect to the axis direction of the base portion 62, the blade 69 disposed at the tip of the cutter 67 is caused to contact the sealing film 70. When the cutter 67 is further moved, the sealing film 70 is force-cut to be opened. At this time, a cut away portion 67b is formed at the tip of the cutter 67, a portion of the sealing film 70 surrounded by the blade 69 (i.e., an opening piece or tear piece 70a) is kept being connected to the sealing film 70 at a position corresponding to the cut away portion 67b, and is prevented from being dropped into the interior of the container. Then, when the cap 65 is removed from the base portion 62, the cutter 67 screwed to the cutter engagement portion 66 is pulled out of the interior of the base portion 62. After the sealing film 70 is once opened in such a manner, the cutter 67 becomes unnecessary and may be removed from the cap 65. Further, in a case where the pouring member 61 is intended to be closed after the sealing film 70 is once opened, the cap 65 alone may be screwed to the base portion 62 thereby to effect sealing.

Figure 14:
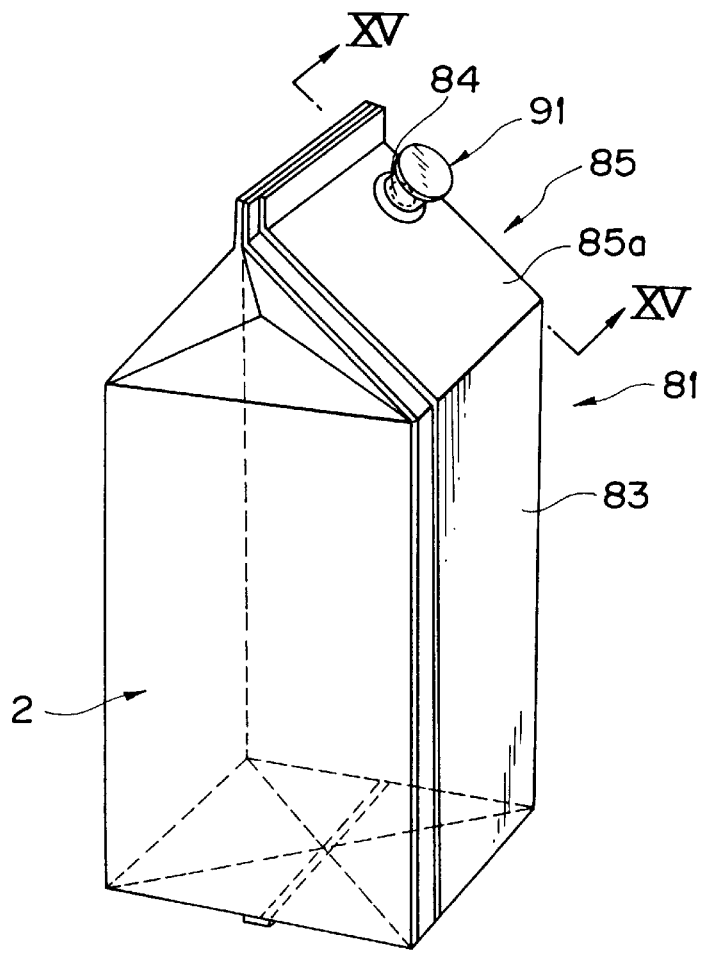
FIG. 14 is a perspective view showing an embodiment of the paper container for a liquid according to the present invention.

FIG. 14 is a perspective view showing another embodiment of the paper container according to the present invention. In FIG. 14, a paper container 81 is a container in the form of a carton which has been shaped by using a base material 2, which is the same as that used in the above embodiment and comprises a body portion 83 and a top portion 85 continuously connected thereto. Further, an opening portion 84 is formed in an inclined panel 85a constituting the top portion 85, and a pouring member 91 is mounted to the opening portion 84.

Figure 15:
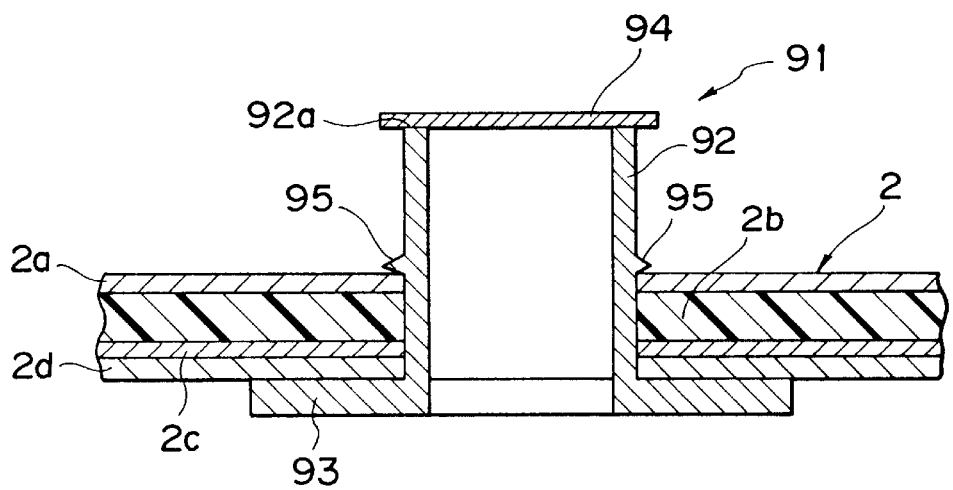
FIG. 15 is a longitudinal sectional view showing the pouring member shown in FIG. 14, taken along the line XV—XV.

FIG. 15 is a longitudinal sectional view showing the pouring member 91 shown in FIG. 14, taken along the line XV—XV. In FIG. 15, the pouring member 91 comprises a cylindrical portion 92 having in a lower end peripheral portion thereof a flange 93 for fixing the pouring member 91 to the inclined panel 85a, a sealing member 94 which is fixed to an upper end surface 92a of the cylindrical portion 92 so that it covers the upper opening portion of the cylindrical portion 92, and an engagement projection 95 in the form of a ring provided to the outer peripheral portion of the cylindrical portion 92. The pouring member 91 may be mounted to the inclined panel 85a by inserting the cylindrical portion into the opening portion 84 from the inside of the container 81 and fixing the upper surface of the flange 93 to the inner surface 2d of the base material 2. At this time, the distance between the engagement projection 95 and the upper surface of the flange 93 may preliminarily be set in accordance with the thickness of the base material 2. Then, the heat fusion and fixing are effected so that the sealing member 94 is caused to contact the upper end surface 92a of the cylindrical portion 92.

The cylindrical portion 92 comprises a shaped member comprising the above amorphous or low crystallinity saturated polyester resin having a glass transition point of 40° C. or higher. Further, the sealing member 94 comprises a sheet comprising a modified polyolefin type resin layer. The modified polyolefin type resin layer of the sealing member 94 is fixed to the cylindrical member 92 by heat fusion so that it is caused to contact the tip portion 92a of the cylindrical portion 92.

The sealing member 94 may comprise a single layer sheet comprising the modified polyolefin type resin, or a laminate sheet comprising a layer such as aluminum foil and a layer formed of the modified polyolefin type resin layer which is contactable to the upper end surface 92a of the cylindrical portion 92. When the sealing member 94 comprises a laminate sheet formed of a metal foil, the sealing member 94 may be bonded to the upper end portion 92a by using a high frequency sealing method.

The sealing member 94 may preferably comprise a laminate sheet obtained by laminating a polyethylene resin layer/a modified polyolefin type resin layer on a metal foil. For example, such a laminate sheet comprises a 12 μm thick biaxially stretched PET film/a 7 μm thick aluminum foil/a 15 μm thick polyethylene resin layer/a modified polyolefin type resin layer.

The modified polyolefin type resin layer to be used for the sealing member 94 may for example comprise an ethylenevinyl acetate copolymer, an ethylene-acrylic acid copolymer, an ethylene-methacrylic acid copolymer, an ethylene ethyl acrylate copolymer, an ionomer, etc., and may generally be formed so as to have a thickness of about 10 to 60 μm. In connection with this, an easily peelable adhesive portion may be formed between the sealing member 94 and the upper end surface 92a of the cylindrical portion 92 comprising a shaped member formed of amorphous or low crystallinity saturated polyester resin having a glass transition point of 60° C. or higher, by heat fusion.

Such a pouring member 91 may be opened by peeling and removing the sealing member 94 which covers the opening portion of the cylindrical portion 92 so that it seals the upper end surface 92a of the cylindrical portion 92. The bonding between the upper end surface 92a of the cylindrical member 92 and the sealing member 94 is formed by using the heat bonding between the modified polyolefin type resin and the shaped member comprising the amorphous or low crystallinity saturated polyester resin having a glass transition point of 60° C. or higher, and therefore the resultant portion has an adhesion strength which is capable of providing considerable peelability. As a result, the opening operation may smoothly be conducted.

Figure 16:
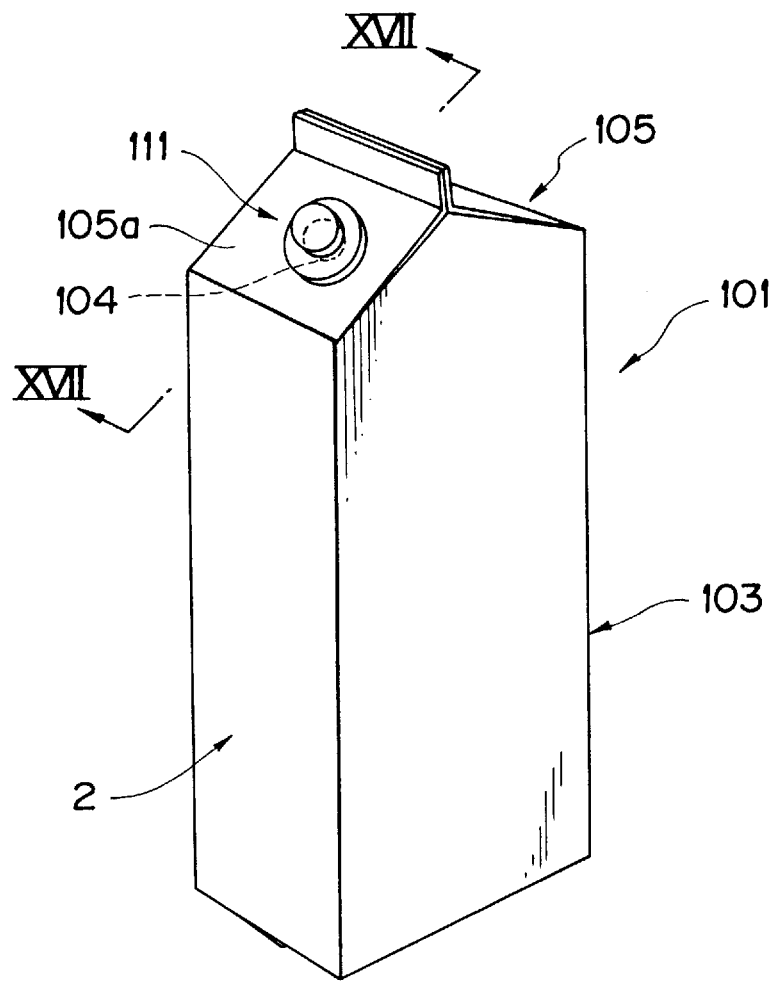
FIG. 16 is a perspective view showing an embodiment of the paper container for a liquid according to the present invention.

FIG. 16 is a perspective view showing a further embodiment of the container according to the present invention. In FIG. 16, a container 101 is a container in the form of a carton which has been shaped by using the base material 2 as described above. The container 101 comprises a body portion 103, and a top portion 105 connected to the body portion 103. Further, an opening portion 104 is formed in an inclined panel 105a of the top portion 105, and a sealing member 111 is mounted to the opening portion 104.

Figure 17:
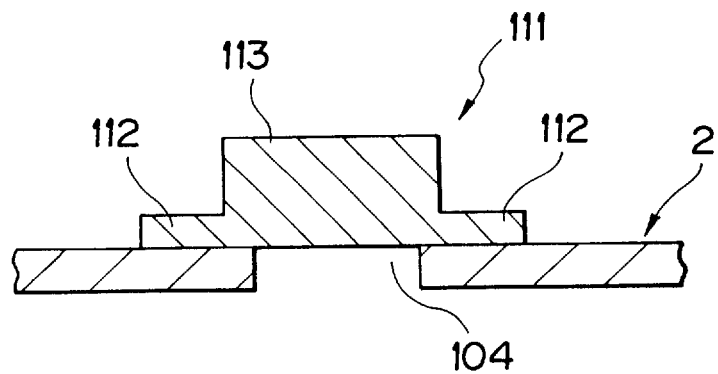
FIG. 17 is a longitudinal sectional view showing the sealing member shown in FIG. 16, taken along the line XVII—XVII.

FIG. 17 is a longitudinal sectional view showing the sealing member 111 shown in FIG. 16, taken along the line XVII—XVII.

In FIG. 17, the sealing member 111 comprises a base portion 112, and a projection 113 disposed in a substantially central portion of the upper surface of the base portion 112. The sealing member 111 comprises a polyolefin type resin, which may preferably be the same resin as that constituting the polyolefin type resin layer 2a forming the outer surface of the base material 2. Further, such a sealing member 111 is mounted to the inclined panel 105a of the container 101 by heat fusion so that the base portion 112 covers the opening portion 104. When the sealing member is caused to have such a structure, it is possible to easily mount the sealing member 111 to the container 101 from the outside of the container 101.

Next, the present invention will be described in more detail with reference to specific Example.

EXAMPLE 1

Base Material for Paper Container

Referring to FIG. 3, an outer surface resin layer 2a comprising a 15 μm thick polyethylene resin coating layer was formed on one side of a thick paper (basis weight=340 g/m$^2$) 2b. Then, on the other side of the thick paper, there were laminated a 20 μm thick copolymer layer 2c comprising a carboxyl group modified polyethylene type resin (Addmer SE 810, mfd. by Mitsui Sekiyu Kagaku Kogyo K.K.), i.e., a copolymer obtained by subjecting polyethylene and maleic acid anhydride to graft polymerization, and a 20 μm thick inner surface resin layer 2d comprising an amorphous saturated polyester resin having a glass transition point of 81° C. (PETG 6763 (terephthalic acid=100 wt. parts, ethylene glycol=62 wt. parts, diethylene glycol=5 wt. parts, 1,4-cyclohexane dimethanol=33 wt. parts), mfd. by Eastman Kodak Co.), by a co-extrusion coating method, thereby to obtain a base material 2.

The resultant laminate resin layer (2d, 2d) to be disposed on the inner side of the paper container with respect to the paper layer 2b of the laminate sheet produced above had a water vapor permeability of 25 $g/m^2 \cdot 24$ hr·1 atm.

Shaping of Paper Container

The base material produced above was shaped so that it had a pressing line (or line of flection) to be used for folding processing, and simultaneously it was punched so as to provide a blank plate (295 mm×295 mm) for a paper container as shown in FIG. 2. Thereafter the blank plate was shaped into a predetermined paper container, and the resultant paper container was filled with 1000 cc of orange juice by using a filling process, i.e., a so-called chilled-filling process, thereby to obtain a paper container 1 for a liquid in the form of a gable top type rectangular parallelepiped schematically shown in FIG. 1.

EXAMPLE 2

Base Material for Paper Container

An outer surface resin layer 2a comprising a 15 μm thick polyethylene resin coating layer was formed on one side of a thick paper (bases weight=340 $g/m^2$) 2b. Then, on the other side of the thick paper, there were laminated a three layer laminate resin layer which comprises a polyolefin resin layer 2c having a laminate structure comprising a 25 μm thick polyethylene resin layer/a 5 μm thick layer of a carboxyl group modified polyethylene type resin (Neucrel 0910 c mfd. by Mitsui DuPont Polychemical, a random copolymer comprising ethylene and methacrylic acid); and a 10 μm thick low crystallinity saturated polyester resin layer 2d having a glass transition point of above 71° C. terephthalic acid=87 wt. parts, isophthalic acid=13 wt. parts, ethylene glycol=97 wt. parts, diethylene glycol=3 wt. parts, crystallinity=3%) by a co-extrusion coating method, thereby to obtain a base material 2.

The resultant laminate resin layer (2d, 2d) to be disposed on the inner side of the paper container with respect to the paper layer 2b of the base material produced above had a water vapor permeability of 20 $g/m^2 \cdot 24$ hr·1 atm.

Shaping of Paper Container

By use of the base material prepared above, a paper container for a liquid in the form of a gable top type rectangular parallelepiped filled with 1000 cc of orange juice according to the chilled-filling process was obtained in the same manner as the shaping process for a paper container used in Example 1.

COMPARATIVE EXAMPLE 1

Base Material for Paper Container

An outer surface resin layer comprising a 15 μm thick polyethylene resin coating layer was formed on one side of a thick paper (basis weight=340 $g/m^2$). Then, on the other side of the thick paper, there was formed a 40 μm thick inner surface resin layer comprising a polyethylene resin by an extrusion coating method, thereby to obtain a comparative base material for a paper container.

The resultant inner surface layer of the base material had a water vapor permeability of 15 $g/m^2 \cdot 24$ hr·1 atm.

Shaping of Paper Container

By use of the comparative base material prepared above, a paper container for a liquid in the form of a gable top type rectangular parallelepiped filled with 1000 cc of orange juice according to the chilled-filling process was obtained in the same manner as the shaping process for a paper container used in Example 1.

COMPARATIVE EXAMPLE 2

Base Material for Paper Container

An outer surface resin layer comprising a 15 μm thick polyethylene resin coating layer was formed on one side of a thick paper (basis weight=340 $g/m^2$). Then, on the other side of the thick paper, there were laminated a resin layer comprising a 10 μm thick layer of a carboxyl group modified polyethylene type resin (Neucrel 0910 c mfd. by Mitsui DuPont Polychemical, a random copolymer comprising ethylene and methacrylic acid); and a 30 μm thick inner surface resin layer comprising an amorphous saturated polyester resin having a glass transition point of 81° C. (PETG 6763, mfd. by Eastman Kodak Co.) by a co-exctrusion coating method, thereby to obtain a comparative base material for a paper container.

The resultant laminate resin layer to be disposed on the inner side of the paper container with respect to the paper layer of the base material produced above had a water vapor permeability of 30 $g/m^2 \cdot 24$ hr·1 atm.

Shaping of Paper Container

By use of the comparative base material prepared above, a paper container for a liquid in the form of a gable top type rectangular parallelepiped filled with 1000 cc of orange juice according to the chilled-filling process was obtained in the same manner as the shaping process for a paper container used in Example 1.

COMPARATIVE EXAMPLE 3

Base Material for Paper Container

An outer surface resin layer comprising a 15 μm thick polyethylene resin coating layer was formed on one side of a thick paper (basis weight=340 $g/m^2$). Then, on the other side of the thick paper, there were laminated a resin layer comprising a 10 μm thick layer of a carboxyl group modified polyethylene type resin (Neucrel 0910 c mfd. by Mitsui DuPont Polychemical, a random copolymer comprising ethylene and methacrylic acid); and a 20 μm thick inner surface resin layer comprising an amorphous saturated polyester resin having a glass transition point of 81° C. (PETG 6763 (terephthalic acid=100 wt. parts, ethylene glycol=62 wt. parts, diethylene glycol=5 wt. parts, 1,4-cyclohexane dimethanol=33 wt. parts), mfd. by Eastman Kodak Co.) by a co-extrusion coating method, thereby to obtain a comparative base material for a paper container.

The resultant laminate resin layer to be disposed on the inner side of the paper container with respect to the paper layer of the base material produced above had a water vapor permeability of 37 g/m²·24 hr·1 atm.

Shaping of Paper Container

By use of the comparative base material prepared above, a paper container for a liquid in the form of a gable top type rectangular parallelepiped filled with 1000 cc of orange juice according to the chilled-filling process was obtained in the same manner as the shaping process for a paper container used in Example 1.

Experiment 12 pieces of each of various species of paper containers obtained in Examples and Comparative Examples as described above were left standing in an environment of 7 to 8° C. for 5 days. Thereafter, the states of the swelling of the body which had occurred in the respective paper containers were observed, and the flavors of the orange juice contained in the respective paper containers were confirmed by an organoleptic test (or sensory test).

The thus obtained results are shown in the following Table 1.

TABLE 1

| Paper container | Occurrence of body swelling | Flavor of orange juice |
| --- | --- | --- |
| Example 1 | None | Confirmed |
| Example 2 | Substantially none | Confirmed |
| Comparative Example 1 | None | Not confirmed |
| Comparative Example 2 | Observed | Confirmed |
| Comparative Example 3 | Observed | Confirmed |

EXAMPLE 3

A base material was prepared in the same manner as in Example 1. By use of the thus obtained base material, a blank plate 7 as shown in FIG. 2 was prepared in the same manner as in Example 1.

Then, left and right side portions of the outer surface resin layer 2a comprising a coating layer of a polyethylene resin and the inner surface resin layer 2d formed of an amorphous saturated polyester resin having a glass transition point of 81° C., which were to be bonded to each other, were subjected to a surface treatment using flame. Thereafter, the left and right side portions of the blank plate 7 were bonded to each other by heat sealing so as to form an envelope like product, whereby a cylindrical member was formed.

Then, when the bottom portion of the cylindrical member was formed, a portion of the outer surface resin layer 2a which was to be heat-fused to the inner surface resin layer 2d was subjected to a corona discharge treatment so that the surface thereof treated with the corona discharge had a wet tensile strength of 50 dyne, and a predetermined paper container was shaped by use of the resultant cylindrical member at a heat sealing temperature 150° C.

Then, the thus obtained paper container was filled with a content by a filling process, thereby to obtain a gable top type paper container for a liquid having an appearance as shown in FIG. 1, i.e., a paper container for a liquid in the form of a gable top type rectangular parallelepiped filled with 1000 cc of orange juice according to the chilled-filling process.

In FIG. 2, the hatched portion of the blank plate 7 corresponds to the portion of the outer resin layer surface treated with the corona discharge at the time of the formation of the bottom portion.

The heat bonding strength between the outer surface resin layer and the inner surface resin layer at the bottom portion of the resultant paper container was 1.5 kg/(15 mm width).

COMPARATIVE EXAMPLE 4

By use of a base material having the same structure as that of the laminate sheet obtained in Example 1, a paper container for a liquid in the form of a gable top type rectangular parallelepiped filled with 1000 cc of orange juice according to the chilled-filling process was obtained in the same manner as in Example 3 except for removing the corona discharge treatment step from the steps for shaping the paper container used in Example 3.

The heat bonding strength between the outer surface resin layer and the inner surface resin layer at the bottom portion of the resultant paper container was 0.7 kg/(15 mm width).

The present invention may be embodied in various ways without deviating from the spirit or predominant feature thereof. Therefore, the embodiments as described above are only examples in all respects, and the present invention should not be restricted to the specific embodiments as described above. The scope of the present invention is defined by claims, and is not confined to the body of the specification. Any modification or change falling within the equivalent range of the claims is in the scope of the present invention.

What is claimed is:

1. A paper container for a liquid being formed from a base material which comprises:

a paper layer, a polyolefin resin layer disposed on one side of the paper layer, for providing an outer surface of the base material and providing an outer peripheral surface of the container, and a saturated polyester resin layer disposed on the other side of the paper layer by the medium of a polyolefin resin layer, for providing an inner surface;

wherein the saturated polyester resin layer for providing the inner surface comprises an amorphous or low-crystallinity saturated polyester resin having a glass transition point of not lower than 60° C., the saturated polyester resin layer of the paper container being composed of a copolymer containing a carboxylic acid component including a terephthalic acid and another carboxylic acid and an alcohol component including at least an ethylene glycol, wherein the main carboxylic acid component is terephthalic acid, the saturated polyester resin layer being laminated on the polyolefin resin layer by the medium of a carboxyl group modified polyethylene resin and a portion of the base material to be disposed on the inner side of the paper container with respect to the paper layer having a water vapor permeability of not less than 10 g/m²·24 hr·1 atm and not higher than 25 g/m²·24 hr·1 atm; and wherein the portion of the base material to be disposed on the inner side of the paper container with respect to the paper layer has an oxygen permeability of not higher than 900 cc/m²·24 hr·1 atm.

2. A paper container for a liquid according to claim 1, wherein said another carboxylic acid of said carboxylic acid component comprises isophthalic acid.

3. A paper container for a liquid according to claim 1, wherein the alcohol component further comprises 1, 4 cyclohexane dimethanol in addition to said ethylene glycol.

4. A paper container for a liquid according to claim 1, wherein said another carboxylic acid of said carboxylic acid component comprises trimellitic acid, and the alcohol component further comprises trimethylol propane in addition to said ethylene glycol.

5. A paper container for a liquid according to claim 1, further comprising an opening portion and a pouring member inserted into the opening portion from the inside of the paper container, wherein the pouring member comprises a flange which is fixed to the saturated polyester resin layer providing the inner surface of the paper container, and at least the flange constituting the pouring member is formed from a resin selected from an adhesive polyolefin resin and a linear-saturated polyester resin having durometer-hardness (HDD) of 20 to 50.

6. A paper container for a liquid according to claim 1, further comprising an opening portion, a sealing film which is fixed to the saturated polyester resin layer providing the inner surface of the paper container from the inside of the paper container so that it covers the opening portion, and a pulling tab which is fixed to the sealing film from the outside of the paper container so that it covers the opening portion wherein the sealing film is formed from a resin selected from an adhesive polyolefin resin and a linear-saturated polyester resin having a durometer-hardness (HDD) of 50 to 90.

7. A paper container for a liquid according to claim 6, wherein at least a surface of the pulling tab contactable to the sealing film is formed from a resin selected from an adhesive polyolefin resin and a linear-saturated polyester resin having a durometer-hardness (HDD) of 50 to 90.

8. A paper container for a liquid according to claim 1, further comprising an opening portion and a pouring member inserted into the opening portion from the inside of the paper container, wherein the pouring member comprises a cylindrical base portion having a flange at a lower end portion thereof and an upper end portion projecting from the opening portion to the outside of the paper container, a cap detachably screwed to the base portion, a sealing film fixed to the bottom surface of the flange so that it covers the opening portion of the base portion, and a cutter which is screwed to the cap, and is capable of being moved toward the sealing film in the interior of the base portion when the cap is removed from the base portion; the flange is fixed to the saturated polyester resin layer providing the inner surface of the paper container; and at least the flange constituting the pouring member is formed from an amorphous or low-crystallinity saturated polyester resin having a glass transition point of not lower than 60° C.

9. A paper container for a liquid according to claim 1, further comprising an opening portion and a pouring member inserted into the opening portion from the inside of the paper container, wherein the pouring member comprises a cylindrical base portion having a flange at a lower end portion thereof and an upper end portion projecting from the opening portion to the outside of the paper container, and a sealing film fixed to the upper surface of the base portion; the flange is fixed to the saturated polyester resin layer providing the inner surface of the paper container; at least the flange constituting the pouring member is formed from an amorphous or low-crystallinity saturated polyester resin having a glass transition point of not lower than 60° C.; and at least a surface portion of the sealing film contactable to the upper surface of the base portion is formed from an adhesive polyolefin resin.

10. A paper container for a liquid according to claim 1, further comprising an opening portion and a sealing member which is fixed to the paper container from the outside thereof so that it covers the opening portion, wherein the sealing member has a flange at a lower peripheral portion thereof, the flange is fixed to the polyolefin resin layer providing the outer surface of the paper container, and at least the flange constituting the sealing member is formed from a polyolefin resin.

11. A paper container for a liquid being formed from a base material which comprises:

a paper layer, a polyolefin resin layer disposed on one side of the paper layer, for providing an outer surface of the base material and providing an outer peripheral surface of the container, and a saturated polyester resin layer disposed on the other side of the paper layer by the medium of a polyolefin resin layer, for providing an inner surface;

wherein the saturated polyester resin layer for providing the inner surface comprises an amorphous or low-crystallinity saturated polyester resin having a glass transition point of not lower than 60° C., comprising a copolymer formed of a carboxylic acid of terephthalic acid and isophthalic acid and an alcohol of ethylene glycol and diethylene glycol, wherein the main carboxylic acid component is terephthalic acid, the saturated polyester resin layer being laminated on the polyolefin resin layer by the medium of a carboxylic group modified polyethylene resin, and a portion of the base material to be disposed on the inner side of the paper container with respect to the paper layer having a water vapor permeability of not less than 10 g/m²·24 hr·1 atm and not higher than 25 g/m²·24 hr·1 atm and an oxygen permeability of not higher than 900 cc/m²·24 hr·1 atm.

12. A paper container for a liquid according to claim 11, wherein the portion of the base material to be disposed on the inner side of the paper container with respect to the paper layer has an oxygen permeability of not higher than 900 cc/m²·24 hr·1 atm.

13. A paper container for a liquid according to claim 11, further comprising an opening portion and a pouring member inserted into the opening portion from the inside of the paper container, wherein the pouring member comprises a flange which is fixed to the saturated polyester resin layer providing the inner surface of the paper container, and at least the flange constituting the pouring member being formed from a resin selected from an adhesive polyolefin resin and a linear-saturated polyester resin having durometer-hardness (HDD) of 20 to 50.

14. A paper container for a liquid according to claim 11, further comprising an opening portion, a sealing film which is fixed to the saturated polyester resin layer providing the inner surface of the paper container from the inside of the paper container so that it covers the opening portion, and a pulling tab which is fixed to the sealing film from the outside of the paper container so that it covers the opening portion, wherein the sealing film is formed from a resin selected from an adhesive polyolefin resin and a linear-saturated polyester resin having a durometer-hardness (HDD) of 50 to 90.

15. A paper container for a liquid according to claim 14, wherein at least a surface of the pulling tab contactable to the sealing film is formed from a resin selected from an adhesive polyolefin resin and a linear-saturated polyester resin having a durometer-hardness (HDD) of 50 to 90.

16. A paper container for a liquid according to claim 11, further comprising an opening portion and a pouring member inserted into the opening portion from the inside of the paper container, wherein the pouring member comprises a cylindrical base portion having a flange at a low end portion thereof and an upper end portion projecting from the opening portion to the outside of the paper container, a cap detachably screwed to the base portion, a sealing film fixed to the bottom surface of the flange so that it covers the opening portion of the base portion, and a cutter which is screwed to the cap and is capable of being moved toward the sealing film in the interior of the base portion when the cap is removed from the base portion; the flange is fixed to the saturated polyester resin layer providing the inner surface of the paper container; and at least the flange constituting the pouring member is formed from amorphous or low-crystallinity saturated polyester resin having a glass transition point of not lower than 60° C.

17. A paper container for a liquid according to claim 11, further comprising an opening portion and a pouring member inserted into the opening portion from the inside of the paper container, wherein the pouring member comprises a cylindrical base portion having a flange at a lower end portion thereof and an upper end portion projecting from the opening portion to the outside of the paper container, and a sealing film fixed to the upper surface of the base portion; the flange is fixed to the saturated polyester resin layer providing the inner surface of the paper container; at least the flange constituting the pouring member is formed from an amorphous or low-crystallinity saturated polyester resin having a glass transition point of not lower than 60° C.; and at least a surface portion of the sealing film contactable to the upper surface of the base portion is formed from an adhesive polyolefin resin.

18. A paper container for a liquid according to claim 11, further comprising an opening portion and a sealing member which is fixed to the paper container from the outside thereof so that it covers the opening portion, wherein the sealing member has a flange at a lower peripheral portion thereof, the flange is fixed to the polyolefin resin layer providing the outer surface of the paper container, and at least the flange constituting the sealing member is formed from a polyolefin resin.

* * * * *